United States Patent
Kitazawa et al.

(10) Patent No.: US 6,911,088 B2
(45) Date of Patent: Jun. 28, 2005

(54) SUBSTRATE PROCESSING APPARATUS AND SLIT NOZZLE

(75) Inventors: Hiroyuki Kitazawa, Kyoto (JP); Tsutomu Ueyama, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 10/391,910

(22) Filed: Mar. 18, 2003

(65) Prior Publication Data

US 2003/0183167 A1 Oct. 2, 2003

(30) Foreign Application Priority Data

Mar. 28, 2002  (JP) ..................................... P2002-091420

(51) Int. Cl.$^7$ ................................................. B05C 5/00
(52) U.S. Cl. ................. 118/323; 118/429; 427/600; 427/421; 239/76
(58) Field of Search ............................... 118/429, 323; 427/600, 421; 239/76

(56) References Cited

U.S. PATENT DOCUMENTS

| | | | | |
|---|---|---|---|---|
| 4,849,768 A | * | 7/1989 | Graham ....................... 347/14 |
| 5,183,508 A | * | 2/1993 | Cholinski .................... 118/683 |
| 5,464,577 A | * | 11/1995 | Leonard et al. ............. 264/40.5 |
| 5,868,153 A | * | 2/1999 | Cohen et al. .................. 137/13 |
| 6,010,570 A | * | 1/2000 | Motoda et al. .............. 118/323 |
| 6,309,692 B1 | * | 10/2001 | Nakamura et al. ............. 427/8 |
| 6,508,196 B1 | * | 1/2003 | Hansson et al. ............ 118/300 |

FOREIGN PATENT DOCUMENTS

| JP | 2-4382 | 1/1990 |
|---|---|---|
| JP | 9-164357 | 6/1997 |
| JP | 2001-310152 | 11/2001 |

* cited by examiner

Primary Examiner—Chris Fiorilla
Assistant Examiner—Michelle Acevedo Lazor
(74) Attorney, Agent, or Firm—Ostrolenk, Faber, Gerb & Soffen, LLP (57) ABSTRACT

A slit nozzle includes a solution feeding mechanism having an elastic element and a plurality of piezoelectric devices and embedded in a side surface of a flow passage near a slit in the slit nozzle. Control is effected so that the piezoelectric devices are vibrated to cause the elastic element to produce traveling waves toward the slit. A resist solution serving as a processing solution is pumped by the traveling waves, thereby to be discharged through the slit toward a substrate. This provides a substrate processing apparatus capable of smoothly discharging the processing solution to accomplish high discharge accuracy.

19 Claims, 7 Drawing Sheets

SUBSTRATE PROCESSING APPARATUS AND SLIT NOZZLE

BACKGROUND OF THE INVENTION

1. Field of the Invention

The present invention relates to a technique for a substrate processing apparatus. More particularly, the invention relates to a technique for a slit nozzle for discharging a predetermined processing solution toward substrates such as a glass substrate for manufacturing a flat-panel display.

2. Description of the Background Art

The trend in application of a processing solution to a substrate is toward the popularization of scan coating which carries out scanning using a slit nozzle for discharging the processing solution to apply the processing solution to a predetermined position on the substrate.

Some apparatuses which carry out the scan coating comprise a supply pump provided in the slit nozzle and mechanically operative to feed a processing solution, thereby discharging the processing solution from a slit at the tip of the nozzle during the scanning operation.

However, because of the mechanical operation of the supply pump to feed the processing solution, the conventional apparatuses having the pump in the slit nozzle produce a pulsing stream of the processing solution being discharged, which impairs the uniform discharge of the processing solution. Other problems with the conventional apparatuses are as follows. A distance prone to be long from the supply pump to a tapered discharge port causes poor discharging responsiveness. It is difficult to uniformly discharge the solution from a discharge port having the shape of an elongated slit even if there are provided a plurality of supply ports of the solution to the nozzle. The discharge uniformity depends on the finishing accuracy of the nozzle, and the finishing accuracy is not adjustable.

SUMMARY OF THE INVENTION

The present invention is intended for a technique for a substrate processing apparatus. More particularly, the invention is intended for a technique for a slit nozzle for discharging a predetermined processing solution toward substrates such as a glass substrate for manufacturing a flat-panel display.

According to the present invention, the substrate processing apparatus comprises: a holding table for holding a substrate; a bridging structure to which a slit nozzle for discharging a predetermined processing solution is attached, the bridging structure being provided to span across a surface of the holding table; and a moving mechanism for moving the bridging structure along a surface of the substrate held by the holding table, the slit nozzle including a liquid feeding element for feeding the processing solution in a predetermined direction by using a wave phenomenon, wherein while the bridging structure is moved along the surface of the substrate, the slit nozzle scans the surface of the substrate to form a layer of the processing solution on the surface of the substrate.

The present invention is also intended for a slit nozzle for forming a layer of the processing solution on a surface of a substrate. The slit nozzle comprises: a liquid feeding element for feeding a predetermined processing solution in a predetermined direction by using a wave phenomenon; and a slit for discharging the processing solution therethrough.

This allows smooth discharge of the processing solution to accomplish high discharge accuracy.

The provision of the liquid feeding element near the slit in the slit nozzle ensures high responsivity to accomplish higher discharge accuracy.

Preferably, the slit nozzle further comprises a flow rate control element for controlling the flow rate of the processing solution fed in the predetermined direction by the liquid feeding element. The flow rate control is effected so as to compensate for the finishing accuracy, if somewhat low, of the members constituting the slit nozzle to allow the use of such members, thereby ensuring a margin of the finishing accuracy of the slit nozzle. This accomplishes high discharge accuracy without the need for manual fine adjustment.

The flow rate control element controls the flow rate of the processing solution individually in each of a plurality of positions along the slit in the slit nozzle. This compensates for variations in flow rate of the processing solution when viewed in the longitudinal direction of the slit, to accomplish smooth discharge of the processing solution.

It is therefore an object of the present invention to provide a substrate processing apparatus and a slit nozzle capable of smoothly discharging a processing solution to accomplish high discharge accuracy.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
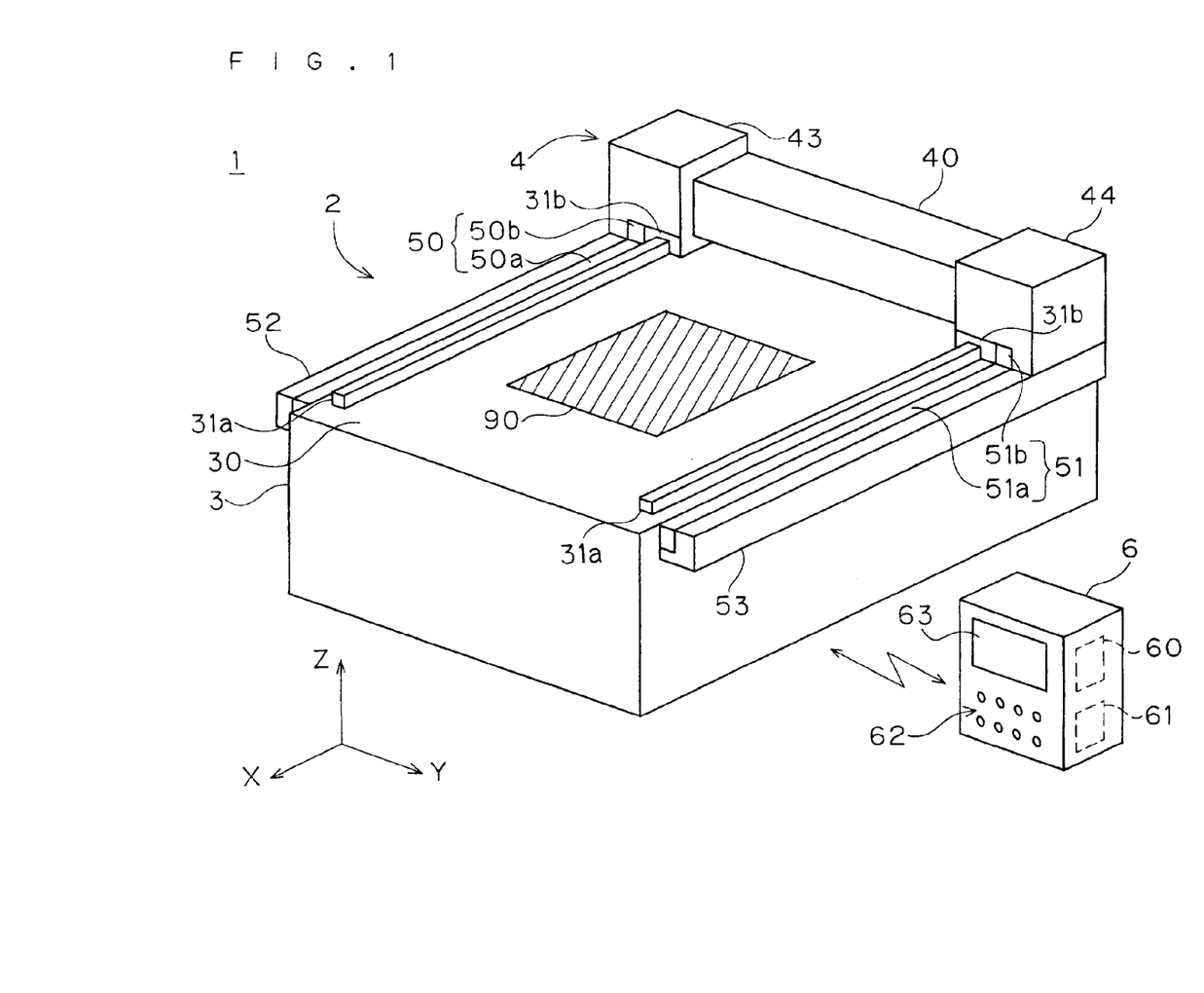
FIG. 1 is a schematic perspective view of a substrate processing apparatus according to a first preferred embodiment of the present invention.
Figure 2:
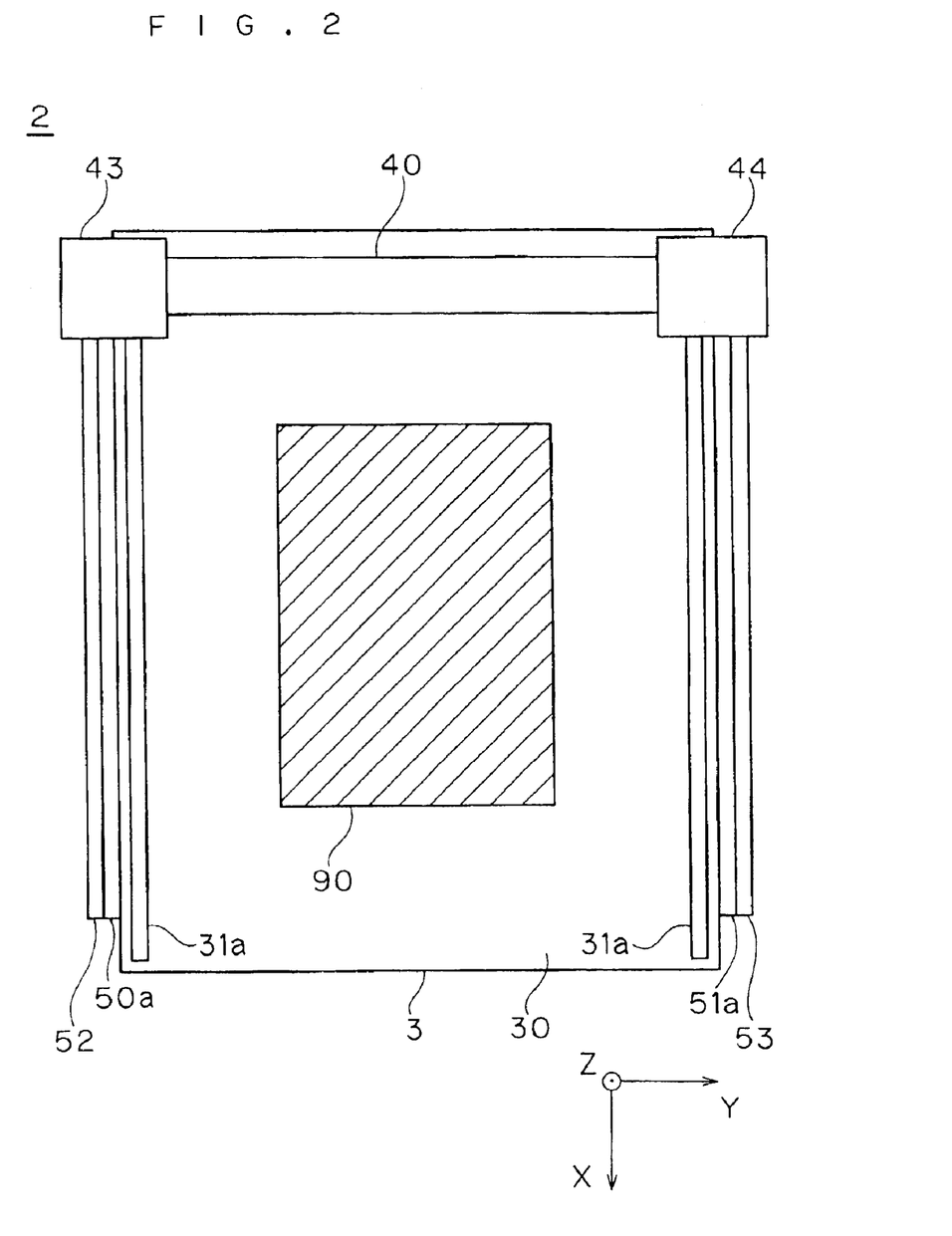
FIG. 2 is a top plan view of a main body of the substrate processing apparatus.
Figure 3:
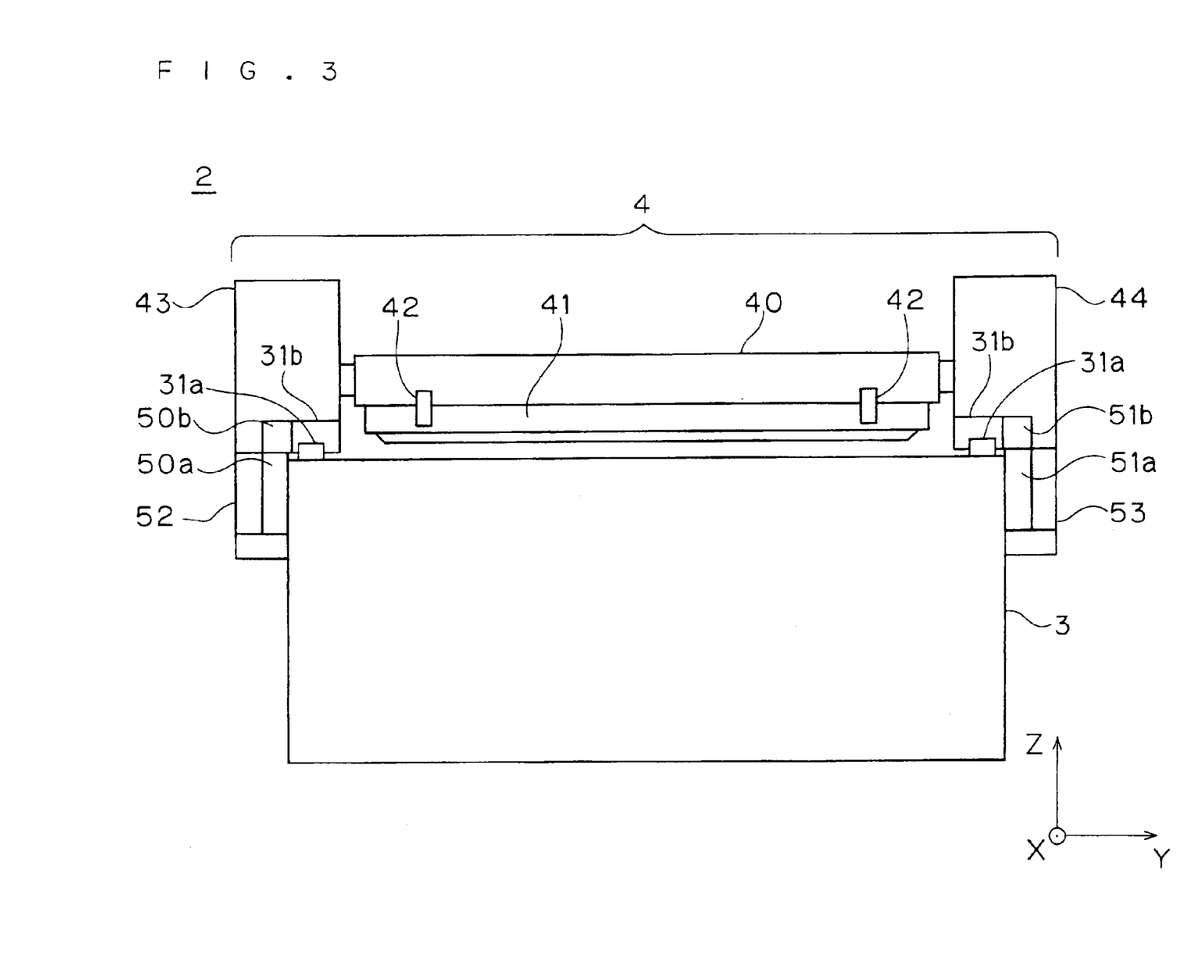
FIG. 3 is a front view of the main body.
Figure 4:
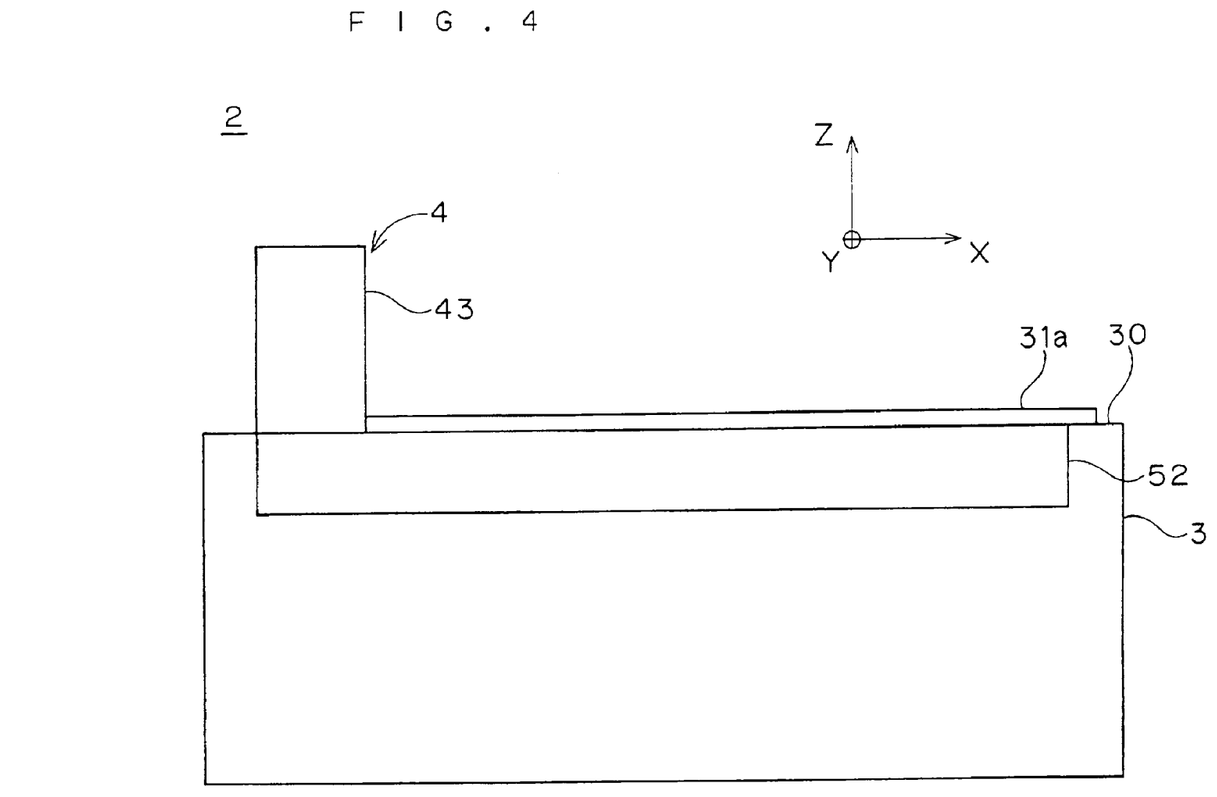
FIG. 4 is a side view of the main body.

FIG. 1 is a schematic perspective view of a substrate processing apparatus 1 according to a first preferred embodiment of the present invention. FIG. 2 is a top plan view of a main body 2 of the substrate processing apparatus 1. FIGS. 3 and 4 are front and side views, respectively, of the main body 2.

The substrate processing apparatus 1 is generally comprised of the main body 2 and a control system 6. A substrate 90 to be processed by the substrate processing apparatus 1 is a rectangular glass substrate for manufacture of a screen panel of a liquid crystal display device. The substrate processing apparatus 1 is constructed as a coater for applying a resist solution to the surface of the substrate 90 in the process of selectively etching an electrode layer and the like formed on the surface of the substrate 90. In this preferred embodiment, a slit nozzle 41 is designed to discharge the resist solution. It should be noted that the substrate processing apparatus 1 may be generally used in a modified form as an apparatus for applying processing solutions (liquid chemicals) to various substrates for flat-panel displays.

The main body 2 includes a stage 3 functioning as a holding table for placing and holding the substrate 90 to be processed thereon and as a base for attached mechanisms. The stage 3 is made out of stone and has the unitary shape of a rectangular parallelepiped. The stage 3 has a top surface (or a holding surface 30) and side surfaces all of which are worked into flat surfaces.

The top surface of the stage 3 is horizontal and serves as the holding surface 30 for the substrate 90. The holding surface 30 is formed with a multiplicity of vacuum suction holes distributed therein for attaching the substrate 90 to the holding surface 30 by vacuum suction to hold the substrate 90 in a predetermined horizontal position during the processing of the substrate 90 in the substrate processing apparatus 1.

A pair of parallel running rails 31a extending substantially horizontally are provided in a fixed condition on opposite sides of the holding surface 30 in such a manner that a substrate holding area (an area in which the substrate 90 is held) of the holding surface 30 lie therebetween. The pair of running rails 31a, in conjunction with support blocks 31b provided in a fixed condition on opposite ends of a bridging structure 4, constitute a linear guide for guiding the movement of the bridging structure 4 (or limiting the direction of movement of the bridging structure 4 to a predetermined direction) and for supporting the bridging structure 4 over the holding surface 30.

The bridging structure 4 is provided over the stage 3 so as to substantially horizontally span the distance between opposite sides of the stage 3. The bridging structure 4 mainly comprises a nozzle support portion 40 made of carbon fiber resin, and lifting mechanisms 43 and 44 which support the opposite ends of the nozzle support portion 40.

The slit nozzle 41 and gap sensors 42 are attached to the nozzle support portion 40, as shown in FIG. 3.

A pipe and a resist pump 70 (to be described later with reference to FIG. 5) for supplying the liquid chemicals to the slit nozzle 41, and a phase converter 81 (to be described later with reference to FIG. 5) are connected to the slit nozzle 41 extending horizontally in the Y direction. The slit nozzle 41 is supplied with the resist solution by the resist pump 70 and scans the surface of the substrate 90, thereby to discharge the resist solution to a predetermined region (referred to hereinafter as a "resist receiving region") on the surface of the substrate 90.

The gap sensors 42 are attached to the nozzle support portion 40 so as to be near the slit nozzle 41, and detects a vertical difference (or a gap) between themselves and their underlying object (e.g., the surface of the substrate 90 or the surface of a resist film) to transmit a result of detection to the control system 6.

Such attachment of the slit nozzle 41 and the gap sensors 42 to the nozzle support portion 40 provides a fixed relative positional relationship therebetween. This allows the control system 6 to detect the distance between the surface of the substrate 90 and the slit nozzle 41 based on the result of detection from the gap sensors 42.

The lifting mechanisms 43 and 44 are provided separately on opposite ends of the slit nozzle 41 and are coupled to the slit nozzle 41 by the nozzle support portion 40. The lifting mechanisms 43 and 44 are used to cause the slit nozzle 41 to make upward and downward translational movements and to adjust the posture of the slit nozzle 41 in the Y-Z plane.

A pair of AC coreless linear motors (referred to simply as "linear motors" hereinafter) 50, 51 are provided in a fixed condition on the opposite ends of the bridging structure 4 and are separately disposed along the opposite side edges of the stage 3.

The linear motor 50 includes a stator 50a and a moving element 50b, and generates a driving force for moving the bridging structure 4 in the X direction by means of the electromagnetic interaction between the stator 50a and the moving element 50b. The amount and direction of the movement by the linear motor 50 are controllable by a control signal from the control system 6. The linear motor 51 is generally similar in function and construction to the linear motor 50.

Each linear encoder 52 and 53 includes a scale portion and a detector (not shown), and detects a relative positional relationship between the scale portion and the detector to transmit a result of detection to the control system 6. The detectors of the respective linear encoders 52 and 53 are provided in a fixed condition on the opposite ends of the bridging structure 4, and the linear encoders 52 and 53 detect the position of the bridging structure 4.

The control system 6 is connected to the mechanisms attached to the main body 2 by cables not shown. Based on signals from a console part 62 and various sensors, the control system 6 controls the stage 3, the bridging structure 4, the lifting mechanisms 43, 44, the linear motors 50, 51, and other components such as the resist pump 70, a power supply 80 to piezoelectric devices and the phase converter 81 which will be described later with reference to FIG. 5.

A storage part 61 used herein includes a RAM for temporarily storing data therein, a ROM (read-only memory), a magnetic disk device and the like. The storage part 61 may be a storage medium such as a portable magneto-optical disk and a memory card, or a device for reading such a storage medium. The console part 62 includes buttons and switches (including a keyboard and a mouse). The console part 62 may be a part which additionally has the function of a display part 63, such as a touch panel display. The display part 63 includes a liquid crystal display and various lamps.

Description will be given on the construction of the slit nozzle 41 in the substrate processing apparatus 1 according to the first preferred embodiment of the present invention.

Figure 5:
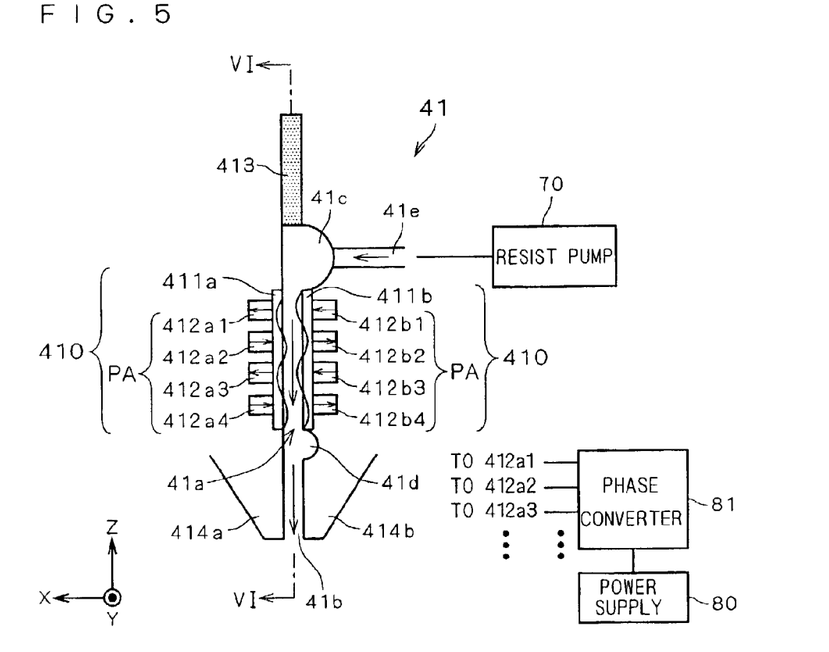
FIG. 5 is a structural view, in section, of a slit nozzle in the substrate processing apparatus according to the first preferred embodiment.
Figure 6:
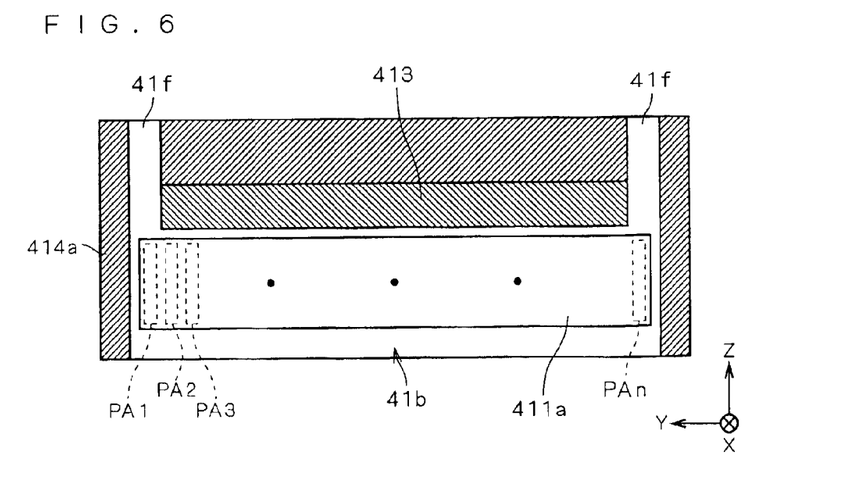
FIG. 6 is a sectional view of the slit nozzle taken along the line VI—VI of FIG. 5 in the substrate processing apparatus according to the first preferred embodiment.

FIG. 5 is a structural view, in section, of the slit nozzle 41 in the substrate processing apparatus 1 according to the first preferred embodiment of the present invention. FIG. 6 is a sectional view of the slit nozzle 41 taken along the line VI—VI of FIG. 5 in the substrate processing apparatus 1 according to the first preferred embodiment.

The slit nozzle 41 comprises a solution feeding mechanism 410 serving as a liquid feeding element for feeding a resist solution serving as a processing solution in a predetermined direction by using wave phenomena (more specifically, wall surface wave phenomena at surfaces extending along a flow passage 41a of the processing solution). The solution feeding mechanism 410 is provided near a slit 41b (discharge hole) in the slit nozzle 41 and is embedded in opposed side surfaces of respective side surface members 414a and 414b. Thus, exposed surfaces of the solution feeding mechanism 410 in the side surface members 414a and 414b constitute gap defining surfaces which define a gap (the flow passage 41a) between the side surface members 414a and 414b.

The solution feeding mechanism 410 includes elastic elements 411a and 411b serving as a flexible object, and a plurality of piezoelectric devices 412. The piezoelectric devices are hereinafter designated by the reference numeral 412 when they are collectively referred to, and are designated by the reference characters 412a1, 412a2, . . . , 412b1, 412b2, . . . when they are individually referred to.

As shown in FIG. 6, the elastic element 411a extends along the entire length of the slit 41b (in the Y direction), and a plurality of piezoelectric device arrays PA1, PA2, . . . , PAn (although shown collectively as piezoelectric device arrays PA in FIG. 5) each including the plurality of piezoelectric devices 412a1, 412a2, . . . arranged in the Z direction are arranged in alignment along the entire length of the slit 41b so as to be provided in a laminar form on the elastic element 411a. That is, n piezoelectric device arrays PA of the solution feeding mechanism 410 are disposed along the slit 41b (where n is a natural number). The material of the elastic elements 411a and 411b may be fluororesin, metal or the like.

Although only four piezoelectric devices 412a1 to 412a4 or 412b1 to 412b4 are shown in each piezoelectric device array PA in a simplified form in FIG. 5, each piezoelectric device array PA actually includes more piezoelectric devices 412.

Two chambers (first and second chambers 41c and 41d) are provided in the slit nozzle 41. The first chamber 41c is provided at a connection between the flow passage 41a communicating with the slit 41b and provided with the solution feeding mechanism 410 and a pipe 41e from the resist pump 70. The first chamber 41c functions as a buffer for the resist solution fed from the resist pump 70 which is a metering pump provided outside the slit nozzle 41, and stabilizes the amount of the resist solution fed to the flow passage 41a toward the slit 41b.

The second chamber 41d is provided between the slit 41b and the solution feeding mechanism 410 of the flow passage 41a communicating with the slit 41b, and particularly near the solution feeding mechanism 410. The second chamber 41d functions as a resist solution buffer for canceling the pulsation resulting from the pumping of the resist solution fed by vibrations to be described later of the piezoelectric devices 412, variations between the piezoelectric devices 412, the influence of the clearance between the piezoelectric devices 412, and the like.

The slit nozzle 41 comprises a shim 413 for defining a gap. The slit nozzle 41 is constructed such that the side surface members 414a and 414b on opposite sides are bonded together with the shim 413 therebetween. The shim 413 provides constant accuracy or higher of the flow passage 41a and the slit width.

Electrodes (not shown) for voltage application are attached to the respective piezoelectric devices 412 and are electrically connected to the phase converter 81. The phase converter 81 is electrically connected to the power supply 80, and converts the phase of the voltage supplied from the power supply 80. As discussed above, the phase converter 81 and the power supply 80 are electrically connected to the control system 6.

The piezoelectric devices 412 are adapted to vibrate in a direction (X direction) perpendicular to the side surface of the flow passage 41a in response to a change in applied voltage. In other words, the control system 6 controls the phase of the voltage applied to the piezoelectric devices 412 through the phase converter 81, thereby to control the phase of the vibrations of the piezoelectric devices 412.

Vibrations of the piezoelectric devices (the piezoelectric devices 412a1 to 412a4 and 412b1 to 412b4 arranged in a resist solution feed direction) in the piezoelectric device arrays PA under the control of the control system 6 deform the elastic elements 411a and 411b to produce waves traveling toward the slit 41b (in the −Z direction).

The traveling waves (two traveling waves formed in the same position as seen in the Y direction among the traveling waves formed in the elastic members 411a and 411b) produced by opposed piezoelectric device arrays PA on opposite side surfaces of the flow passage 41a have the same wavelength, the same cycle and the same amplitude, but are out of phase with each other by about one quarter wavelength (or a phase angle of 90 degrees). Thus, the elastic elements 411a and 411b are controlled to make a so-called peristaltic motion, and the slit nozzle 41 feeds the resist solution in pumping fashion by using the traveling waves resulting from the vibrations of the piezoelectric devices 412, that is, the wall surface wave phenomena at the surfaces extending in the −Z direction.

The wavelength of the traveling waves produced at the elastic elements 411a and 411b is determined by the distance between adjacent piezoelectric devices in a piezoelectric device array PA (e.g., the distance between the piezoelectric devices 412a1 and 412a2) and a phase shift of the vibrations of these piezoelectric devices. Thus, the control system 6 can control the phase of the vibration of each piezoelectric device 412 thereby to control the wavelength of the corresponding traveling wave. The flow rate of the resist solution flowing through the flow passage 41a is determined by the wavelength of the corresponding traveling wave. That is, the control system 6 can control the phase of the voltage applied to each piezoelectric device 412, to allow the piezoelectric device arrays PA provided in the plurality of positions along the slit 41b to individually control the flow rate of the resist solution to be fed.

Hence, an operator can check the discharge state of the resist solution, and if the discharge state is nonuniform, the operator can control the piezoelectric devices 412 through the control system 6 so as to cancel the nonuniformity, thereby to constantly maintain a fixed discharge state of the resist solution. For instance, if nonuniform resist solution discharge conditions are found on the left and right sides, as seen in the X direction, of the slit nozzle 41, control is effected on the vibrations of the piezoelectric devices 412 to correct the flow rates on the left and right sides so as to cancel the nonuniformity, thereby improving the uniformity of discharge conditions.

In this manner, even if somewhat low accuracy of manufacture of members such as the side surface members 414a and 414b of the slit nozzle 41 causes variations in flow rate of the resist solution discharged from the slit nozzle 41 when viewed in the Y direction, controlling the piezoelectric devices 412 so as to compensate for the variations achieves the increase in the uniformity of the thickness of the film formed on the substrate 90. The elastic elements 411a and 411b in the slit nozzle 41 may be structured such that a plurality of rectangular elastic elements with the piezoelectric device arrays PA provided thereon in laminar form are arranged in the Y direction.

The slit nozzle 41 further comprises vent holes 41f on opposite longitudinal ends of the first chamber 41c, as shown in FIG. 6. In general, there is a likelihood that gases are present in the resist solution fed from the pipe 41e. The gases are collected in an upper portion of the first chamber 41c and released outwardly through the vent holes 41f. This removes the gases present in the resist solution prior to the application of the resist solution to the substrate to improve the uniformity of the resist film. Valves not shown may be provided in the vent holes 41f and be opened to vent the gases during standby during which the slit nozzle 41 is not in use.

The operation of the substrate processing apparatus 1 will now be described. A resist coating process in the substrate processing apparatus 1 is commenced by an operator or a transport mechanism not shown transporting the substrate 90 to a predetermined position. The operator may manipulate the console part 62 to enter a command for commencement of the process when the transport of the substrate 90 is completed.

First, the stage 3 holds the substrate 90 in a predetermined position on the holding surface 30 by vacuum suction. Then, based on a control signal from the control system 6, the lifting mechanisms 43 and 44 set the gap sensors 42 attached to the nozzle support portion 40 at a predetermined vertical position (referred to hereinafter as a "measurement height"), and the linear motors 50 and 51 move the bridging structure 4 in the X direction to move the gap sensors 42 to over the resist receiving region. The resist receiving region termed herein is a region of the surface of the substrate 90 to which the resist solution is intended to be applied. Typically, the resist receiving region corresponds to the total area of the substrate 90 from which a peripheral region extending along the edges and having a predetermined width is removed.

Next, the gap sensors 42 measure the gap between the surface of the substrate 90 in the resist receiving region and the slit nozzle 41.

When the gap sensors 42 complete scanning in such a manner that the bridging structure 4 passes over the substrate 90 in the X direction, the control system 6 stops the bridging structure 4 at that position. Then, using a control signal based on the result of measurement from the gap sensors 42, the control system 6 controls the lifting mechanisms 43 and 44 to move the nozzle support portion 40 in the Z direction, thereby adjusting the slit nozzle 41 to a proper posture.

Next, the linear motors 50 and 51 move the bridging structure 4 in the −X direction to move the slit nozzle 41 to a discharge start position. The discharge start position termed herein is a position in which the slit nozzle 41 is situated substantially along one side of the resist receiving region.

When the slit nozzle 41 is moved to the discharge start position, the control system 6 applies a control signal to the linear motors 50, 51, the resist pump 70, the power supply 80 and the phase converter 81. Based on the control signal, the linear motors 50, 51 move the bridging structure 4 in the −X direction, whereby the slit nozzle 41 scans the surface of the substrate 90. During the scanning by the slit nozzle 41, the resist pump 70 is driven to feed the resist solution to the slit nozzle 41. The control system 6 controls the power supply 80 and the phase converter 81 to operate the solution feeding mechanism 410, whereby the slit nozzle 41 discharges the resist solution onto the resist receiving region. This forms a layer of resist on the surface of the substrate 90.

When the slit nozzle 41 is moved to a discharge end position, the control system 6 applies a control signal to the linear motors 50, 51, the resist pump 70, the power supply 80 and the phase converter 81. Based on the control signal, the linear motors 50, 51, the resist pump 70 and the solution feeding mechanism 410 come to a halt to stop the movement of the bridging structure 4 in the −X direction and the discharge of the resist solution from the slit nozzle 41. The lifting mechanisms 43 and 44 move the gap sensors 42 to the measurement height.

The linear motors 50 and 51 move the bridging structure 4 in the X direction to cause the gap sensors 42 to scan the resist receiving region. The gap sensors 42 measure the gap between the resist film formed on the substrate 90 and the slit nozzle 41 to transmit the result of measurement to the control system 6. The control system 6 makes a comparison between the value of the gap measured before the resist application (or a distance from the surface of the substrate 90) and the value of the gap measured after the resist application (or a distance from the surface of the resist film) to calculate the thickness of the resist film on the substrate 90, and presents the result of calculation on the display part 63.

After the inspection of the resist film, the stage 3 stops attaching the substrate 90 thereto by vacuum suction. The operator or the transport mechanism takes the substrate 90 away from the holding surface 30, and transports the substrate 90 to the next processing step.

The above described is the substrate processing operation of the substrate processing apparatus 1 according to the first preferred embodiment.

According to the first preferred embodiment of the present invention, as discussed above, the slit nozzle 41 has the solution feeding mechanism 410 (the piezoelectric device arrays PA) for feeding the processing solution (resist solution) by using the wave phenomena, to smoothly discharge the processing solution, thereby accomplishing high discharge accuracy.

The plurality of piezoelectric device arrays PA are provided along the slit 41b of the slit nozzle 41, and the control system 6 independently controls the piezoelectric device arrays PA. Thus, the control system 6 can effect independent flow rate control in the plurality of positions along the slit 41b. This compensates for variations in flow rate of the resist solution when viewed in the longitudinal direction of the slit 41b, to accomplish smooth discharge of the processing solution.

The provision of the solution feeding mechanism 410 near the slit 41b of the slit nozzle 41 ensures high responsivity.

The conventional apparatus having the supply pump mechanically operative to supply the processing solution involves the need to increase the finishing accuracy of the members constituting the slit nozzle for the purpose of uniform discharge, and also necessitates the manual fine adjustment of the members. In the first preferred embodiment according to the present invention, however, the control system 6 controls the vibrations of the piezoelectric devices 412 to effect the fine flow rate control. The flow rate control is effected so as to compensate for the finishing accuracy, if somewhat low, of the members constituting the slit nozzle 41 to allow the use of such members, thereby ensuring a margin of the finishing accuracy of the slit nozzle 41. Additionally, the first preferred embodiment accomplishes high discharge accuracy without the need for manual fine adjustment of the gap in the slit.

Further, the control system 6 can control the amount of discharge from the slit nozzle 41. Therefore, differences between apparatuses when mass-produced are easily eliminated by adjusting the control for each apparatus.

In the first preferred embodiment, the solution feeding mechanism 410 having the elastic elements 411a, 411b and the piezoelectric devices 412 is used as the liquid feeding element for feeding the resist solution by using the wave phenomena. Alternatively, the liquid feeding element may comprise magnetostrictors provided on similar elastic elements and arranged in the same pattern as the piezoelectric devices 412, and magnet coils for applying a magnetic field to the magnetostrictors, respectively, in which case the phase of current fed to the magnet coils is controlled through the phase converter 81 by the control system 6. Such an arrangement also produces effects similar to those of the first preferred embodiment.

Figure 7:
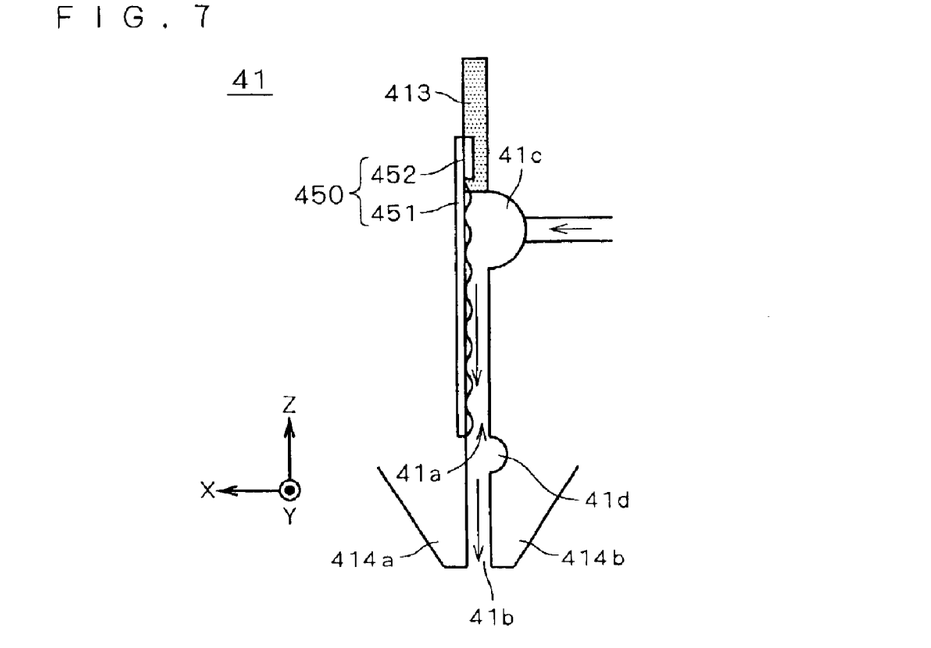
FIG. 7 is a structural view, in section, of the slit nozzle in the substrate processing apparatus according to a second preferred embodiment of the present invention.

FIG. 7 is a structural view, in section, of the slit nozzle 41 in the substrate processing apparatus 1 according to a second preferred embodiment of the present invention. In the second preferred embodiment, components similar to those of the first preferred embodiment are designated by the same reference numerals and characters as in the first preferred embodiment.

The slit nozzle 41 of the second preferred embodiment differs from that of the first preferred embodiment in comprising a plurality of surface acoustic wave generating devices 450 (only one of which is illustrated in FIG. 7) in place of the solution feeding mechanism 410 of the slit nozzle 41 of the first preferred embodiment. The surface acoustic wave generating devices 450 are provided on one of the gap defining surfaces which are the inner side surfaces of the gap between the side surface members 414a and 414b. In other words, the surface acoustic wave generating devices 450 constitute the one gap defining surface. Specifically, each of the surface acoustic wave generating devices 450 extends along the flow passage 41a from the first chamber 41c to the second chamber 41d.

Each of the surface acoustic wave generating devices 450 serving as the liquid feeding element for feeding the resist solution by using the wave phenomena (wall surface wave phenomena) is structured such that interdigital electrodes 452 are attached to a piezoelectric crystal surface 451. More specifically, the piezoelectric crystal surface 451 extends along the flow passage 41a from part of the shim 413 which is closer to the slit 41b to the second chamber 41d, and the interdigital electrodes 452 are provided between the piezoelectric crystal surface 451 and the shim 413. In a similar manner to the piezoelectric device arrays PA of the first preferred embodiment, the plurality of surface acoustic wave generating devices 450 are arranged in alignment along the entire length of the slit 41b (in the Y direction).

In such surface acoustic wave generating devices 450, voltage application to the interdigital electrodes 452 generates surface acoustic waves (SAWs or Rayleigh waves). Since the surface acoustic waves are traveling waves, the resist solution in the flow passage 41a is forced to be fed toward the slit 41b.

The substrate processing operation in the second preferred embodiment is similar to that in the first preferred embodiment except that the surface acoustic wave generating devices 450, in place of the solution feeding mechanism 410, feed the resist solution.

The control system 6 controls the voltage applied to each of the interdigital electrodes 452 through the phase converter 81 (not shown) to thereby individually control the flow rate in each part of the slit 41b in the slit nozzle 41 in a similar manner to the first preferred embodiment.

Other structures of the substrate processing apparatus 1 according to the second preferred embodiment are similar to those according to the first preferred embodiment.

As discussed above, the second preferred embodiment uses the surface acoustic wave generating devices 450 as the liquid feeding element to produce effects similar to those of the first preferred embodiment.

Figure 8:
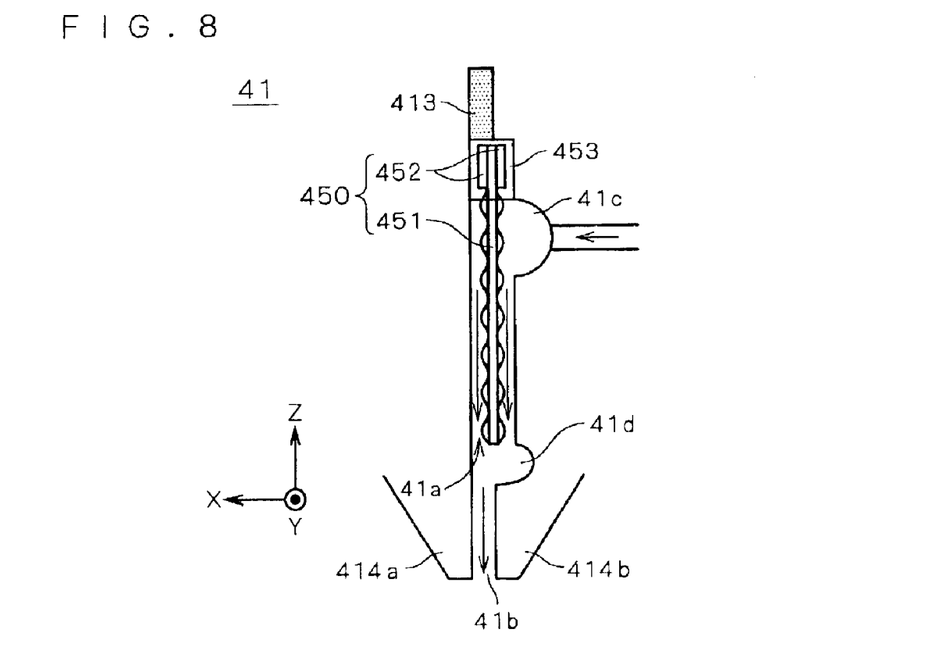
FIG. 8 is a structural view, in section, of the slit nozzle in the substrate processing apparatus according to a third preferred embodiment of the present invention.

FIG. 8 is a structural view, in section, of the slit nozzle 41 in the substrate processing apparatus 1 according to a third preferred embodiment of the present invention. In the third preferred embodiment, components similar to those of the second preferred embodiment are designated by the same reference numerals and characters as in the second preferred embodiment.

Although the surface acoustic wave generating devices 450 in the slit nozzle 41 according to the second preferred embodiment are provided on one of the gap defining surfaces, the surface acoustic wave generating devices 450 in the slit nozzle 41 according to the third preferred embodiment are supported in the gap between the side surface members 414a and 414b by a support member 453. More specifically, the support member 453 is fixed between the side surface members 414a and 414b of the slit nozzle 41 and adjacent to the opposite side of the first chamber 41c from the flow passage 41a, and a pair of interdigital electrodes 452 are embedded in the support member 453 while holding one end of the piezoelectric crystal surface 451 therebetween. The remaining portion of the piezoelectric crystal surface 451 is in the middle of the gap, that is, equidistant from the opposite inner surfaces of the flow passage 41a, and extends along the flow passage 41a from the first chamber 41c to the second chamber 41d.

In a similar manner to the second preferred embodiment, the plurality of surface acoustic wave generating devices 450 are arranged in alignment along the entire length of the slit 41b (in the Y direction).

In such surface acoustic wave generating devices 450, voltage application to the interdigital electrodes 452 generates surface acoustic waves. Since the surface acoustic waves are traveling waves, the resist solution in the flow passage 41a is forced to be fed toward the slit 41b. The control system 6 controls the voltage applied to the interdigital electrodes 452 to thereby individually control the flow rate in each part of the slit 41b in the slit nozzle 41 in a similar manner to the first preferred embodiment.

Other structures and operations of the substrate processing apparatus 1 according to the third preferred embodiment are similar to those according to the second preferred embodiment.

As discussed above, the third preferred embodiment uses the wave surface wave phenomena to produce effects similar to those of the second preferred embodiment.

Additionally, the surface acoustic wave generating devices 450 serving as the liquid feeding element for feeding the processing solution (the resist solution) by using the wave phenomena are supported in the gap of the slit nozzle 41 by the support member 453. The mounting of the liquid feeding element is achieved by mounting the support member 453 to the slit nozzle 41. This facilitates the manufacture of the slit nozzle 41, as compared with the direct mounting of the liquid feeding element to the slit nozzle 41.

Figure 9:
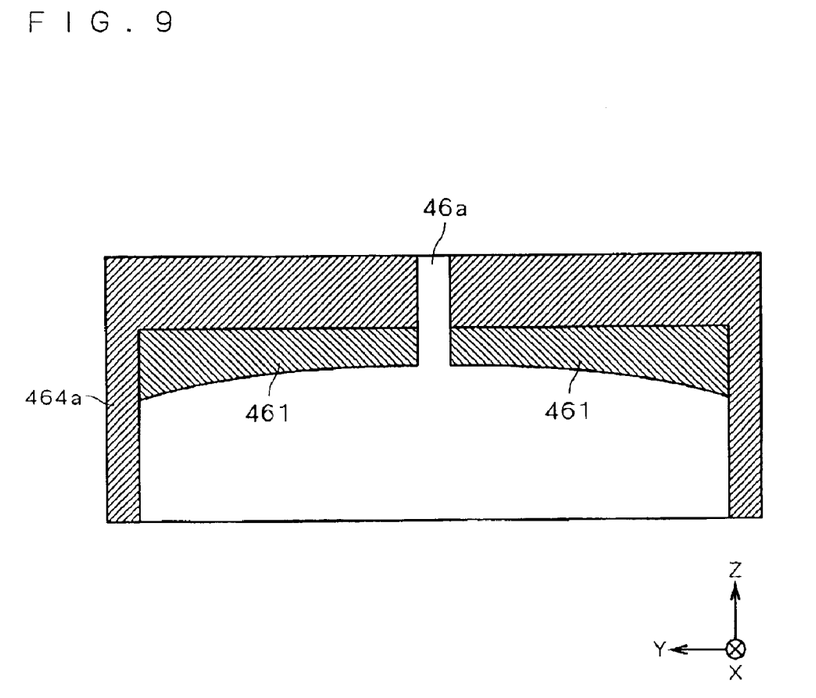
FIG. 9 is a sectional view of the slit nozzle according to a modification of the present invention.

FIG. 9 is a sectional view of the slit nozzle 41 according to a modification of the present invention. Although the vent holes 41f are provided on opposite longitudinal ends of the first chamber 41c in the above-mentioned preferred embodiments, the slit nozzle 41 according to the modification comprises a vent hole 46a in the middle of a side surface member 464a, and is shaped so that the bottom of a shim 461 (or the top of the first chamber 41c) is gradually raised toward the middle thereof. This also removes the gases present in the resist solution as in the above-mentioned preferred embodiments to improve the uniformity of the resist film formed on the substrate. Other structures and operations of the modification are similar to those of the above-mentioned preferred embodiments.

Although the resist solution serving as the processing solution is fed to the substrate in the above-mentioned preferred embodiments, the present invention may be applied to the feed of other solutions or liquids for use in substrate processing, such as various liquid chemicals and rinsing liquid.

While the invention has been described in detail, the foregoing description is in all aspects illustrative and not restrictive. It is understood that numerous other modifications and variations can be devised without departing from the scope of the invention.

What is claimed is:

1. A substrate processing apparatus comprising:
   a holding table for holding a substrate;
   a bridging structure supporting a slit nozzle for discharging from a slit thereof a predetermined processing solution, said bridging structure being provided to span across a surface of said holding table; and
   a moving mechanism for moving said bridging structure along a surface of the substrate held by said holding table;
   said slit nozzle including a liquid feeding element provided in a gap in said slit nozzle and extending in a direction toward said slit and applying varying forces distributed along said direction, in a manner that causes said processing solution to form a wave oscillating in a direction substantially perpendicular to said direction toward said slit while traveling in said direction toward said slit, thereby feeding said processing solution in said direction toward said slit by using a wave characteristic of said wave;
   wherein while said bridging structure is moved along the surface of said substrate, said slit nozzle scans the surface of said substrate to form a layer of said processing solution on the surface of said substrate.

2. The substrate processing apparatus according to claim 1, wherein
   said liquid feeding element is provided near in said slit.

3. The substrate processing apparatus according to claim 1, further comprising
   a flow rate control element for controlling the flow rate of said processing solution fed in said direction toward said slit by said liquid feeding element.

4. The substrate processing apparatus according to claim 3, wherein
   said flow rate control element controls the flow rate of said processing solution individually in each of a plurality of positions along said slit.

5. The substrate processing apparatus according to claim 3, wherein
   control by said flow rate control element provides a nearly uniform flow rate of said processing solution.

6. The substrate processing apparatus according to claim 1, wherein
   said liquid feeding element includes a surface acoustic wave generating device, and said surface acoustic wave generating device feeds said processing solution in said direction toward said slit.

7. The substrate processing apparatus according to claim 6, wherein said liquid feeding element constitutes a gap defining surface of said slit nozzle.

8. The substrate processing apparatus according to claim 6, wherein
   said liquid feeding element is supported in said gap in said slit nozzle by a support member.

9. The substrate processing apparatus according to claim 1, wherein
   said liquid feeding element vibrates in a direction substantially perpendicular to said direction toward said slit.

10. A slit nozzle comprising:
    a slit for discharging a predetermined processing solution; and
    a liquid feeding element provided in a gap in said slit nozzle and extending in a direction toward said slit, and applying varying forces distributed along said direction, in a manner that causes said processing solution to form a wave oscillating in a direction substantially perpendicular to said direction toward said slit while traveling in said direction toward said slit, thereby feeding said processing solution in said direction toward said slit by using a wave characteristic of said wave, whereby a layer of said processing solution is formed on a surface of a substrate.

11. The slit nozzle according to claim 10, wherein
    said liquid feeding element is provided near said slit.

12. The slit nozzle according to claim 10, further comprising
    a flow rate control element for controlling the flow rate of said processing solution fed in said direction toward said slit by said liquid feeding element.

13. The slit nozzle according to claim 12, wherein
    said flow rate control element controls the flow rate of said processing solution individually in each of a plurality of positions along said slit.

14. The slit nozzle according to claim 12, wherein
    control by said flow rate control element provides a nearly uniform flow rate of said processing solution.

15. The slit nozzle according to claim 10, wherein
    said liquid feeding element includes a surface acoustic wave generating device, and said surface acoustic wave generating device feeds said processing solution in said direction toward said slit.

16. The slit nozzle according to claim 15, wherein
    said surface acoustic wave generating element constitutes a gap defining surface of said slit nozzle.

17. The slit nozzle according to claim 15, wherein
    said surface acoustic wave generating element is supported in said gap in said slit nozzle by a support member.

18. The slit nozzle according to claim 10, wherein
    said liquid feeding element vibrates in a direction substantially perpendicular to said direction toward said slit.

19. A substrate processing apparatus comprising:
    a holding table for holding a substrate to which a layer of processing solution is to be applied, the holding table having a width dimension and length dimension;
    a slit nozzle supported above the table and having a sufficient width dimension to span across the substrate, the slit nozzle serving to discharge the processing solution onto the surface of said substrate;
    a moving mechanism for moving said slit nozzle generally along said length dimension of said table while applying said processing solution;

a processing solution feeding mechanism disposed within said slit nozzle and constructed to feed said processing solution in a direction toward said substrate; and said processing feeding mechanism including at least one wave generator that imparts to said processing solution a wavelike property that propagates in a direction toward said substrate, in a manner that enables controlling a processing solution flow rate across said slit nozzle and forming a uniform layer of said processing solution on the surface of said substrate, said processing feeding mechanism being operable by applying varying forces distributed along said direction.

* * * * *